United States Patent
Benzel et al.

(10) Patent No.: US 6,690,468 B1
(45) Date of Patent: Feb. 10, 2004

(54) ARRANGEMENT FOR SIMULTANEOUS ANALYSIS OF SEVERAL OPTICAL LINES

(75) Inventors: Karl Benzel, Dettingen (DE); Thomas Fuhrmann, Eningen (DE); Andreas Conzelmann, Eningen (DE); Eberhard Loecklin, Reutlingen (DE)

(73) Assignee: Wavetek Wandel Goltermann Eningen GmbH & Co. (DE)

( * ) Notice: Subject to any disclaimer, the term of this patent is extended or adjusted under 35 U.S.C. 154(b) by 0 days.

(21) Appl. No.: 09/614,339

(22) Filed: Jul. 12, 2000

(30) Foreign Application Priority Data

Aug. 11, 1999 (EP) .............................. 99115789

(51) Int. Cl.[7] .............. G01J 3/12; G01J 3/18
(52) U.S. Cl. .................. 356/328; 356/333; 356/334
(58) Field of Search ................... 356/303, 305, 356/306, 307, 313, 319, 326, 328, 331, 332, 333, 334, 320

(56) References Cited

U.S. PATENT DOCUMENTS

| | | |
|---|---|---|
| 3,069,967 A | 12/1962 | White et al. |
| 4,676,597 A | 6/1987 | Cisternino |
| 4,718,764 A | 1/1988 | Fink |
| 5,886,785 A * | 3/1999 | Lefevre et al. ............ 356/328 |
| 6,184,985 B1 * | 2/2001 | Chalmers et al. ........... 356/328 |
| 2001/0030745 A1 * | 10/2001 | He et al. ..................... 356/328 |

FOREIGN PATENT DOCUMENTS

| | | | |
|---|---|---|---|
| EP | 0 540 966 | 5/1993 | |
| EP | 0 758 075 | 2/1997 | |
| JP | 57-131037 | * 8/1982 | ................. 356/328 |
| JP | 2-41134 | 3/1990 | |
| JP | 2-275326 | * 11/1990 | ................. 356/328 |
| JP | 11-142240 | * 5/1999 | ................. 356/328 |
| NL | 7905871 | * 1/1981 | ................. 356/328 |

OTHER PUBLICATIONS

Translation of claim 1 for JP 2–41134.

* cited by examiner

Primary Examiner—F. L. Evans
(74) Attorney, Agent, or Firm—Reed Smith LLP

(57) ABSTRACT

An optical spectrum analyzer of novel design, in which several different spectra can be measured and analyzed simultaneously. A measuring signal is used as a reference signal for calibrating the optical spectrum analyzer. The light rays are admitted via a coupling device with several coupling apertures arranged in a line; and via a separate decoupling device comprising respective decoupling apertures arranged in a line, the light rays are decoupled. Height offset is realized by a 90° deviation prism. The arrangement makes possible simultaneous analysis of several optical lines with little retroreflection as well as uninterrupted calibration of the measuring process.

9 Claims, 2 Drawing Sheets

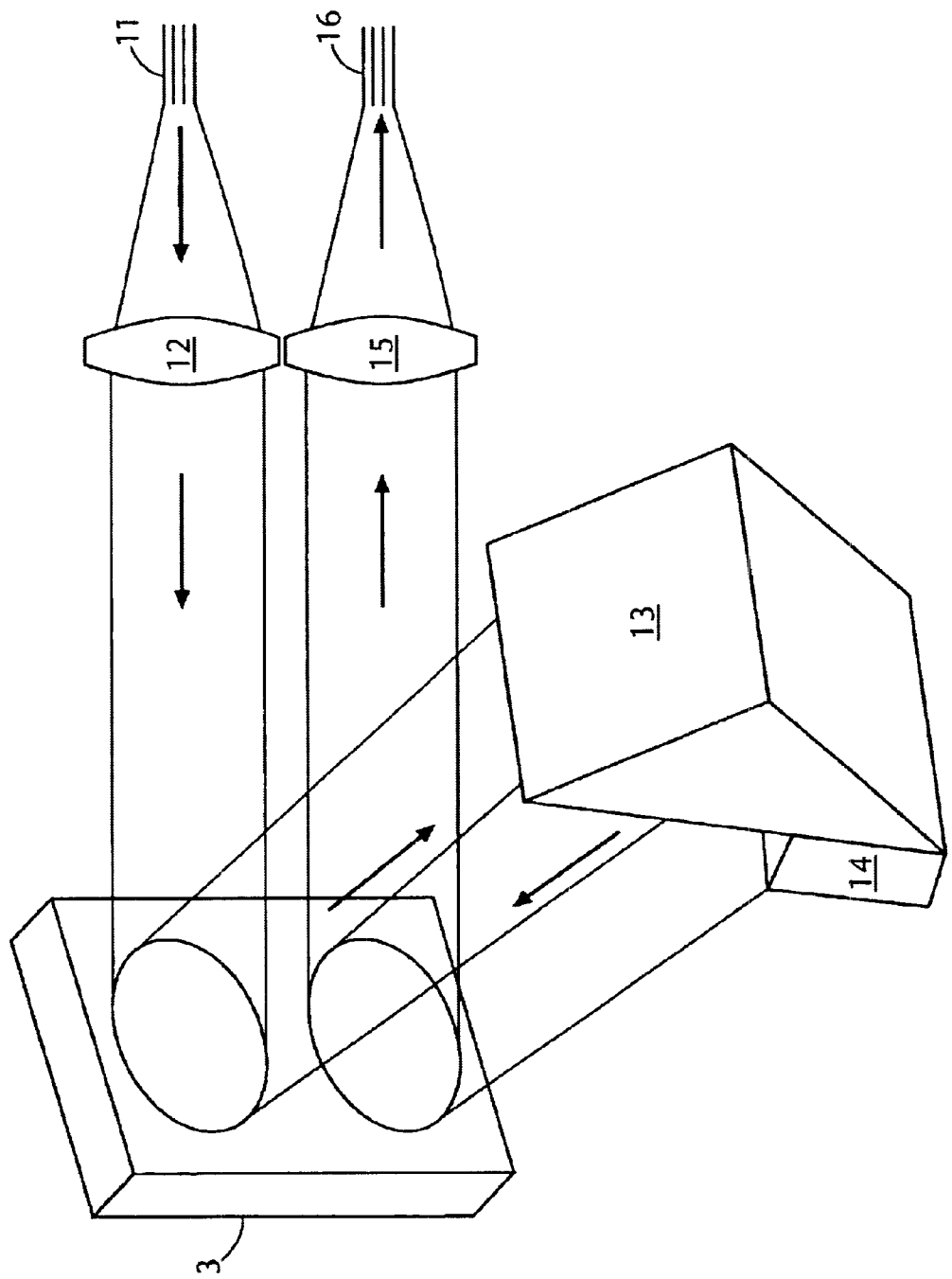

ARRANGEMENT FOR SIMULTANEOUS ANALYSIS OF SEVERAL OPTICAL LINES

BACKGROUND OF THE INVENTION

The present invention relates to high-accuracy optical spectrum analyzers in a new arrangement for carrying out several simultaneous measurements at several signal sources.

In the area of optical communications technology, optical spectrum analyzers are used whose principal areas of application are the characterization of the optical components and the monitoring of optical transmission paths. Optical spectrum analyzers which according to the Littman design comprise a corner prism as a deviation mirror and a common lens for the coupled and decoupled light, provide several advantages such as compact design and robust performance. A big disadvantage is the high retro-reflection to the input fiber, which during measuring of optical components or optical transmission systems can lead to erroneous readings. Such an optical spectrum analyzer is for example disclosed in U.S. Pat. No. 5,886,785.

Conventional optical spectrum analyzers, such as for example those known from EP 0 540 966 B1, have the further disadvantage in that the spectrum of only one source can be measured. If measurements from several sources are required, for example on different optical waveguides of a transmission system or in front of and behind an optical component, then clumsy and time-consuming reconnection of the waveguide, or else installation of an expensive optical switch, is necessary.

It is thus the object of the present invention to propose an option which provides for simultaneous measurement of several optical spectra.

SUMMARY OF THE INVENTION

According to the invention this object is met by using an optical arrangement in an optical spectrum analyzer according to the features set out below. The present invention comprises the use of an optical arrangement comprising a device for coupling several light rays; a collimator for generating parallel bundles of light from the diverging light rays arriving from the device for coupling; a device for dispersing the impinging light rays along a dispersion axis; a deviation device for guiding the dispersed light rays offset in relation to the light rays coming from the dispersion device, for a second time to the dispersion device; a focusing device for focusing the light rays impinging from the dispersion device onto a device for decoupling the light rays, in an optical spectrum analyzer with several inlet and outlet apertures, arranged offset, perpendicular to the dispersion axis of the dispersion device, for simultaneous analysis of several optical spectra, in that the light rays entering via the inlet apertures, of which there are several, independently of each other pass through the arrangement and exit via the outlet apertures and in that the optical performance of the decoupled wavelengths of the light rays is measured simultaneously. Further advantageous embodiments are set out hereinbelow.

BRIEF DESCRIPTION OF THE DRAWINGS

Below, further advantageous embodiments are explained in more detail by means of an example, in conjunction with the accompanying drawings. The following are shown:

FIG. 2 is the optical arrangement in an optical spectrum analyzer according to FIG. 1.

DETAILED DESCRIPTION OF PREFERRED EMBODIMENTS

Figure 1:
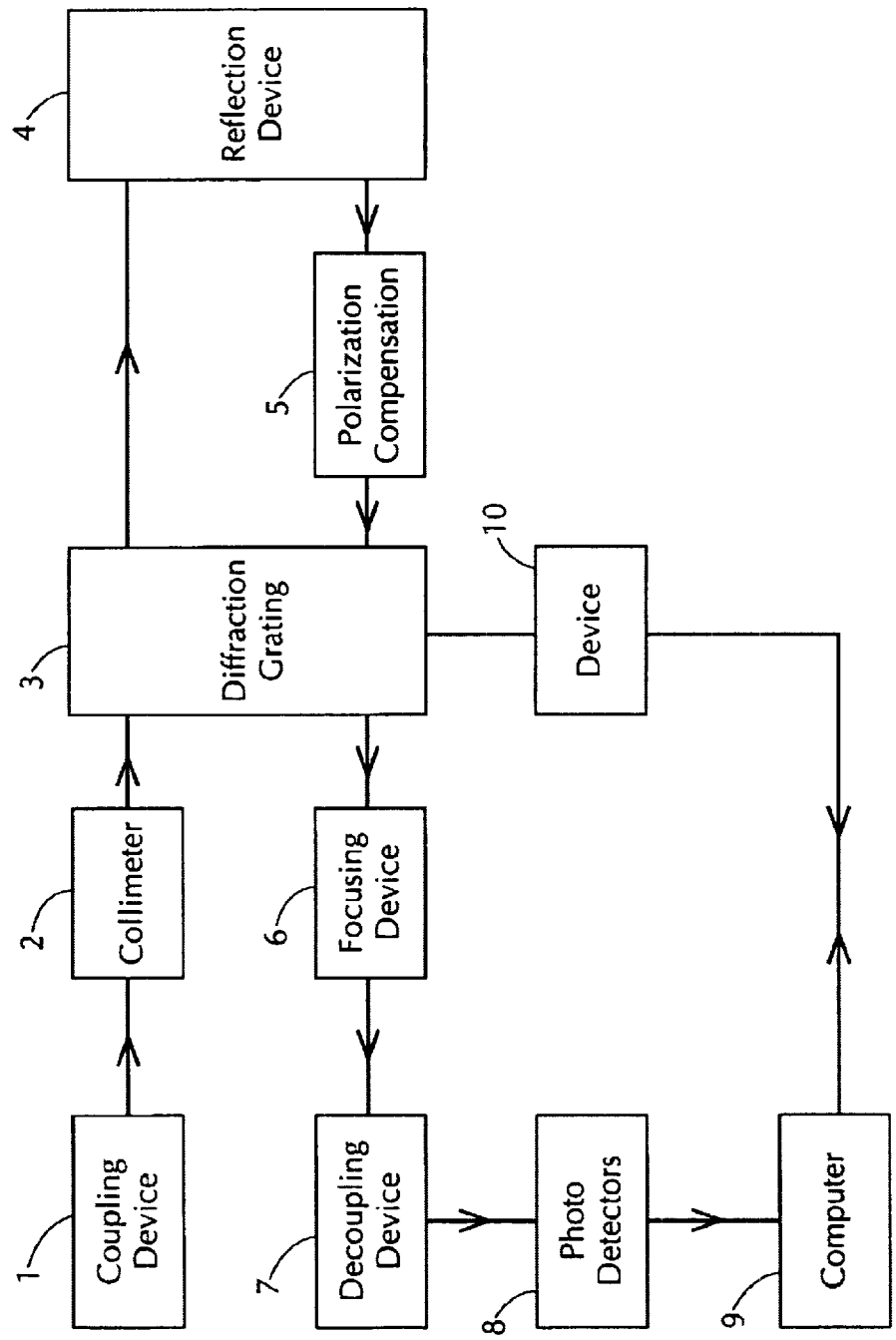
FIG. 1 is a block diagram of an embodiment of an optical spectrum analyzer.

According to the invention an optical arrangement is used with a device for coupling several light rays; a collimator for generating parallel bundles of light from the diverging light rays arriving from the device for coupling; a device for diffracting the impinging light rays along a dispersion axis; a deviation device for guiding the dispersed light rays offset in relation to the light rays coming from the dispersion device for a second time, to the dispersion device; and a focusing device for focusing the light rays impinging from the dispersion device onto a device for decoupling the light rays in an optical spectrum analyzer. For this optical arrangement according to the Fuhrmann design, inlet and outlet apertures as coupling or decoupling devices are used, perpendicular to the dispersion axis of a refraction grating (as a dispersion device), for simultaneous analysis of several optical signal paths. The light rays entering via the inlet apertures, of which there are several, which light rays pass through the arrangement independently, are decoupled via the outlet apertures, and the present decoupled optical performances at a specified wavelength of the light rays are measured simultaneously. Selection of the wavelength to be analyzed takes place according to the methods well known to the expert versed in the art, for example depending on the position of the diffraction grating or the deviation device, by changing the position of the input or output apertures or by introducing a first-image plane in the optical spectrum analyzer in which a diaphragm is moved for wavelength selection. At the inlet- and outlet apertures for example several optical waveguides are arranged in a line. By precisely defined spacing between all coupling- and decoupling apertures, an offset perpendicular to the direction of dispersion of the light is provided, so as to prevent light from cross-coupling between the individual light rays at the outlet gap. The emanating light from each individual light ray is beamed onto a reflecting dispersion grating by a collimator. It is also possible to use a concave diffraction grating (concave mirror) instead of the collimator and the diffraction grating. In front of the optical spectrum analyzer or in the optical spectrum analyzer, a device for compensating the polarization dependence of the optical spectrum analyzer can be arranged. By way of a deviation device, for example a 90° deviation prism, the light coming from the diffraction grating is reflected back to the diffraction grating and in this process it is offset so that it impinges a second time on the diffraction grating, but at another place, spatially offset, where it is dispersed. By way of a focusing device, for example a second lens, subsequently the individual light rays are focused on the decoupling devices from where they can be transmitted via optical waveguides to a photo detector or similar. Single mode fibers may be used as inlet waveguides and outlet waveguides. It is also possible to use multimode waveguides as outlet waveguides.

For wavelength tuning, either the diffraction grating or the deviation device can be rotated in the known way. To this effect, the respective device is connected to a motor with a position sensor which is controlled via a computer and a digital/analog converter. The signal of the position sensor is read out and transmitted to the computer via an A/D converter. From the position signal and the calibration of the spectrum analyzer, the computer can determine the wavelength scanned at any particular instance.

Changes in temperature of the optical arrangement lead to changes of the physical parameters of the existing materials and to wavelength errors which do not meet the requirements for measurement in wavelength multiplex transmission systems. For this reason, according to a further preferred embodiment, a signal path is used as a reference signal with a precisely known wavelength spectrum, for calibrating the optical spectrum analyzer and equalizing the wavelength drift. Subsequently the light is fed in with known spectral characteristics, and the spectrum is simultaneously measured using the measuring channels, without interrupting the measuring process. Based on the existing position information of the motor and the reference spectrum whose wavelength is precisely known, the computer can recalibrate the device parallel to the measuring process. The wavelength of the reference signal may be in the optical spectral range of the signal to be measured. By contrast to other known processes it is not necessary to store the position information relating to the reference spectrum and to evaluate it in a subsequent pass.

The invention provides the advantage that several spectra can be measured simultaneously, and several optical waveguides can be monitored simultaneously. Up to now this necessitated the costly use of several optical spectrum analyzers. The invention makes it possible to take measurements at several sources simultaneously, with only one set of the complicated and costly components such as gratings, drives or mechanical assemblies being required for simultaneous measurements. Since spatially-offset decoupling points are used, very low retroreflection to the coupling points is attained. Furthermore, calibration of the optical spectrum analyzer for compensation of wavelength drift, for example due to heating up, is possible while the device is in operation.

Referring to the drawings, in FIG. 1, the bundle of rays are represented by their principal rays. According to FIG. 1, the optical spectrum analyzer, using a ray arrangement according to the Fuhrmann design, comprises a coupling device 1, a refraction grating 3, a reflection device 4 and a receiving device 7. The coupling device 1 comprises inlet apertures, arranged one on top of the other, via which several light rays enter independently of each other. These are fed to a collimator 2 which transmits the bundle of light rays to a diffraction grating 3. After dispersion, the light rays are transmitted via the reflection device 4 which is a deviation prism and which causes a height offset of the light rays. For polarization compensation, the individual light rays are subsequently transmitted through a device for polarization compensation 5, for example a $\lambda/2$ plate. In this way the polarization-dependent diffraction efficiency of the diffraction grating 3 is compensated for, in which the main axes of polarization are changed over, so that a light ray whose E vector is parallel to the grating dimples in the first pass through the grating, is vertical to the grating dimples in the second pass (and vice versa). After the second pass of the light rays across the diffraction grating 3, the light rays are focused on a decoupling device 7 by means of a suitable focusing device 6. The decoupling device 7 also comprises decoupling apertures, arranged one on top of the other, for the individual light rays. Decoupling or coupling takes place by means of optical waveguides. As an alternative, decoupling of the light of a desired wavelength can take place directly onto a photodiode for each signal path.

The decoupling device 7 is connected to suitable photo detectors 8 which detect the rays received and transmit corresponding signals to a computer 9. Apart from this, the spectrum analyzer comprises a device 10 for setting the rotary movement of the diffraction grating 3 which is connected to the computer 9, so that said computer 9, depending on the position and the wavelength associated with the position, can determine the wavelength measured at a particular instant. The computer 9 simultaneously receives the individual measuring signals received; from these it can determine the respective measuring data and display them simultaneously.

A signal path through the device is used to impinge a reference signal whose wavelength is precisely known or whose spectrum is precisely known; said reference signal being measured simultaneously with the other, unknown, rays which are to be measured. In this way, the wavelength of the optical spectrum analyzer can be calibrated during the measuring process.

The embodiment according to FIG. 2 provides for four optical wave guides 11 arranged one on top of the other. The waveguides used are single-mode standard waveguides for the wavelength range of 1550 nm, with a core diameter of 9 $\mu$m. In order to prevent bridging, the spacing between the waveguides perpendicular to the dispersion axis is 200 $\mu$m. To further reduce retroreflection, the ends of the waveguides may be treated with a suitable anti-reflex coating, or the ends can be polished at an oblique angle, e.g. of 8°. The light rays from the optical waveguides 11, fanned out, are directed to a lens 12 without influencing each other, with said lens 12 collimating these light rays to the reflecting diffraction grating 3. Due to the wide wavelength range of 1280 to 1650 nm of the optical spectrum analyser, an achromatic lens is used which is diffraction limited in the entire wavelength range. The diffraction grating 3 is a flat grating of 900 lines/mm comprising a gold vapor-deposited layer. The individual light rays are dispersed in the known way, directed to a 90° deviation prism 13 comprising a $\lambda/2$ plate 14 covering only half of the deviation prism, a combined deviation device 4 and polarization device 5. Subsequently, the light rays are dispersed a second time by the diffraction grating 3 and directed to a second lens 15 which focuses the individual light rays on four optical wave guides 16, arranged one above the other. As a result of the height-offset coupling- and decoupling points, very little retroreflection to the respective inlet waveguide is achieved.

The light rays emanating from the optical waveguides 11 impinge on the collimator 12 where they turn into parallel rays. Due to the differently positioned coupling points, the individual parallel rays are slightly tilted in respect to each other (approx. 0.30). These light rays impinge on the diffraction grating 3 where they are dispersed to the deviation prism. In the 90° prism the light rays are reflected, offset in height, with the angular tilt between the individual light rays remaining constant. On the way to the second pass across the diffraction grating 3, they pass the $\lambda/2$ plate 14. In the focusing device 15 the parallel rays which are at an angular tilt in respect to each other, are focused, with the height-related order being the same as that at the inlet. In the case of a wide-band light in the optical spectrum analyser there are four parallel light rays with a different wavelength being arranged on each point of a strip. Decoupling of the light of the desired wavelength is via suitable output apertures and optical waveguides 16.

What is claimed is:

1. Method for simultaneous analysis of several optical spectra by use of an optical spectrum analyzer with several inlet and outlet apertures arranged offset, perpendicular to a dispersion axis of a dispersion device comprising the steps of:

receiving a plurality of light rays via said inlet apertures;

independently directing said plurality of light rays to a device for coupling said plurality of light rays to form a plurality of diverging light rays;

using a collimator to generate a plurality of parallel bundles of light from said plurality of diverging light rays arriving from the device for coupling;

dispersing said plurality of bundles of light along a dispersion axis by a dispersion device to form a plurality of dispersed light rays;

deviating said plurality of dispersed light rays by a deviation device and guiding said plurality of dispersed light rays offset in relation to the light rays coming from the dispersion device for a second time to the dispersion device;

focusing said plurality of dispersed light rays by a focusing device from the dispersion device onto a device for decoupling a plurality of wavelengths of the light rays;

emitting said light rays via the outlet apertures; and measuring in simultaneous fashion an optical performance of said plurality of decoupled wavelengths of said light rays.

2. The method of claim 1, wherein said measuring of said optical performance comprises the steps of:

acquiring via a photo sensor said plurality of decoupled wavelengths of said light rays;

digitizing and feeding to a computer said plurality of decoupled wavelengths of said light rays;

determining the optical performance of said plurality of light rays from said plurality of decoupled wavelengths and the position of said dispersion device or said deviation device.

3. The method of claim 1, comprising the additional step of coupling or decoupling a reference signal with a known optical spectrum in a signal path for calibrating the optical spectrum analyzer.

4. The method of claim 2, comprising the additional step of compensating a polarization dependence of a diffraction efficiency of said dispersion device.

5. An optical arrangement for use in an optical spectrum analyzer, comprising:

a device for coupling a plurality of light rays to form a plurality of diverging light rays;

a collimator for generating a plurality of parallel bundles of light from said plurality of diverging light rays arriving from the device for coupling;

a device for dispersing said plurality of bundles of light along a dispersion axis to form a plurality of dispersed light rays;

a deviation device for offsetting in height said plurality of dispersed light rays; and a focusing device for focusing said plurality of offset dispersed light rays from the deviation device onto a device for coupling the light rays.

6. The optical arrangement according to claim 5 wherein a reference light is inputted to the coupling device as one of the plurality of light rays, further comprising:

a photosensor coupled to the decoupling device and operable to receive the plurality of decoupled wavelengths of the light rays; and a computer coupled to the photosensor and the dispersion device, the computer being operable to adjust the dispersion device for calibration based on a decoupled reference light received through the photosensor while the performance of the remaining ones of the plurality of light rays are being evaluated concurrently.

7. The optical arrangement according to claim 5 wherein the dispersion device is disposed to receive the plurality of offset dispersed light rays from the deviation device and forward the same to the focusing device.

8. The optical arrangement according to claim 7 wherein the dispersion device receives the plurality of bundles of light in one area and receives the plurality of offset dispersed light rays in a different area.

9. The optical arrangement according to claim 8, further comprising:

a photosensor coupled to the decoupling device and operable to receive the plurality of decoupled wavelengths of the light rays; and a computer coupled to the photosensor and the dispersion device, the computer being operable to adjust the dispersion device for calibration based on the decoupled reference light received through the photosensor while the performance of the remaining ones of the plurality of light rays are being evaluated concurrently.

* * * * *